(12) United States Patent
Germano

(10) Patent No.: US 10,119,507 B1
(45) Date of Patent: Nov. 6, 2018

(54) ROTATING FUEL INJECTOR ASSEMBLY

(71) Applicant: GM GLOBAL TECHNOLOGY OPERATIONS LLC, Detroit, MI (US)

(72) Inventor: Francesco Germano, Turin (IT)

(*) Notice: Subject to any disclaimer, the term of this patent is extended or adjusted under 35 U.S.C. 154(b) by 0 days.

(21) Appl. No.: 15/651,066

(22) Filed: Jul. 17, 2017

(51) Int. Cl.
| | |
|---|---|
| *F02M 1/00* | (2006.01) |
| *F02M 41/06* | (2006.01) |
| *F02D 41/40* | (2006.01) |
| *F02D 9/04* | (2006.01) |
| *F01L 7/02* | (2006.01) |
| *F02M 59/36* | (2006.01) |
| *F02D 41/28* | (2006.01) |
| *F02M 57/02* | (2006.01) |
| *F02B 75/10* | (2006.01) |
| *F02D 9/02* | (2006.01) |

(52) U.S. Cl.
CPC .......... *F02M 41/066* (2013.01); *F01L 7/028* (2013.01); *F02D 9/04* (2013.01); *F02D 41/401* (2013.01); *F02M 59/362* (2013.01); *F02B 75/10* (2013.01); *F02D 2009/0206* (2013.01); *F02D 2041/281* (2013.01); *F02M 57/022* (2013.01)

(58) Field of Classification Search
CPC ...... F02M 61/10; F02M 61/145; F02M 61/14; F02M 51/0603; F02M 61/04; F02M 61/08
USPC ...... 123/305, 468–470, 472, 490; 239/581.1, 239/581.2, 582.1, 583, 584, 585.1, 585.5, 239/586
See application file for complete search history.

(56) References Cited

U.S. PATENT DOCUMENTS

| | | | |
|---|---|---|---|
| 3,323,506 A | 6/1967 | Pigeroulet et al. | |
| 3,933,133 A | 1/1976 | Shekleton | |
| 5,487,368 A * | 1/1996 | Bruning | F02M 61/14 123/470 |
| 6,230,983 B1 * | 5/2001 | Kasen | F02M 57/025 239/585.1 |
| 6,244,525 B1 * | 6/2001 | Gallup | F02M 51/0625 239/533.12 |
| 6,273,346 B1 * | 8/2001 | Estevenon | F02M 61/162 239/533.9 |
| 6,390,393 B1 * | 5/2002 | Bulgatz | F02M 51/0625 239/585.1 |
| 6,418,912 B1 * | 7/2002 | Lorraine | F02M 51/005 123/470 |
| 6,446,597 B1 * | 9/2002 | McAlister | F02B 3/06 123/296 |

(Continued)

OTHER PUBLICATIONS

Dmitri Kopeliovich, "Engine Bearing Materials," available at, http://kingbearings.com/files/Engine_Bearing_Materials.pdf.

*Primary Examiner* — John Kwon

(57) ABSTRACT

A rotating fuel injector assembly for a vehicle engine includes a base, an internal tip, an intermediate coaxial tip, and an external coaxial tip. The internal tip may be configured to move between an extended closed position and a retracted open position relative to the base. The intermediate coaxial tip may include an opening defined in a base of the intermediate coaxial tip. The base and the opening abuts the internal tip when the internal tip is in the extended closed position. The external coaxial tip may move between an extended open position and a retracted closed position relative to the base. The external coaxial tip includes a plurality of apertures which may align with the at least one opening in the intermediate coaxial tip at a predetermined event.

20 Claims, 11 Drawing Sheets

(56) References Cited

U.S. PATENT DOCUMENTS

| | | | | |
|---|---|---|---|---|
| 7,299,998 B2 | * | 11/2007 | Ricco | F02M 47/027 239/585.1 |
| 2004/0155124 A1 | * | 8/2004 | Noller | F02M 51/0685 239/585.1 |
| 2014/0353408 A1 | * | 12/2014 | Harvey | F02M 55/005 239/584 |
| 2015/0013650 A1 | * | 1/2015 | McAlister | F02M 57/06 123/538 |
| 2017/0241473 A1 | | 8/2017 | Murrish et al. | |

* cited by examiner

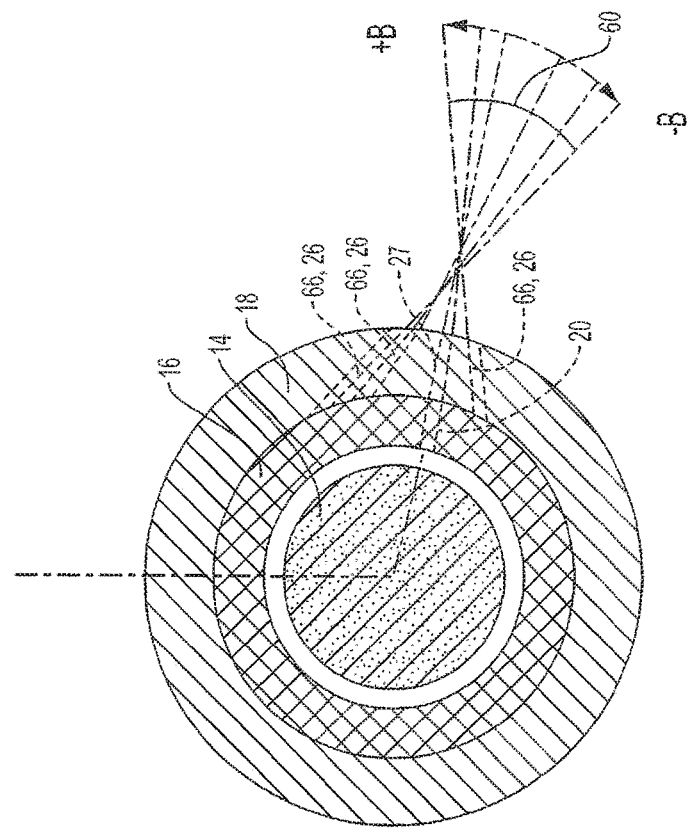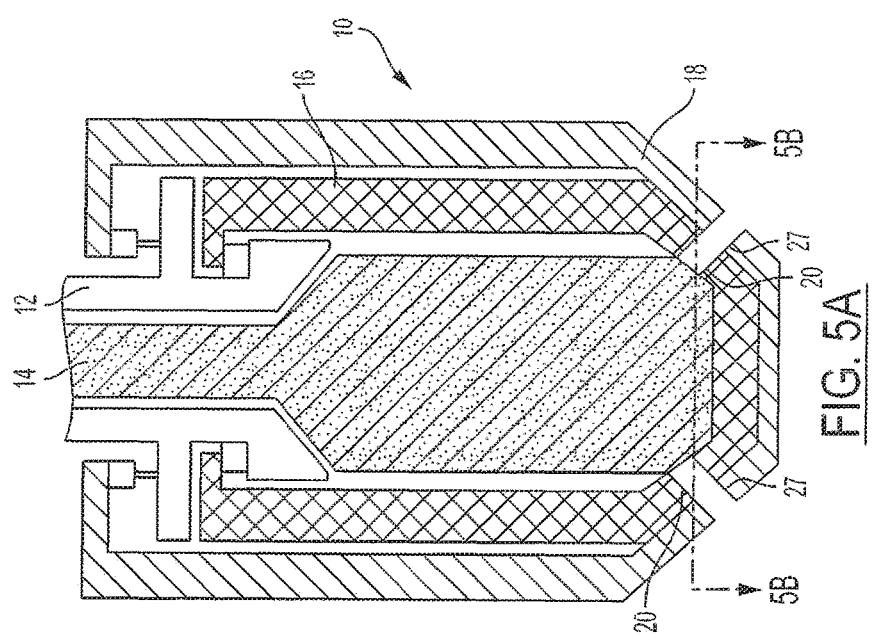
FIG. 5B
FIG. 5A

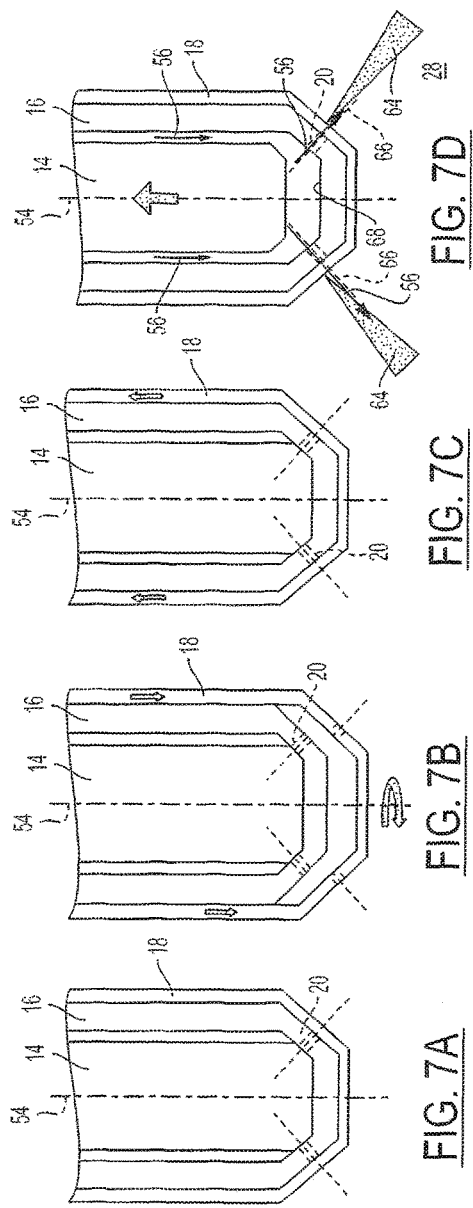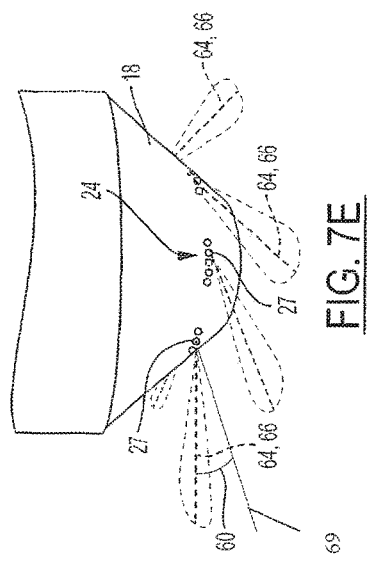

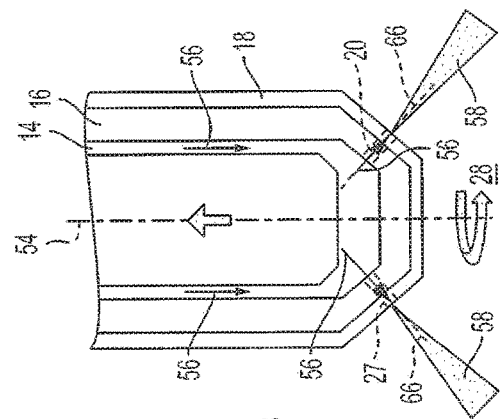
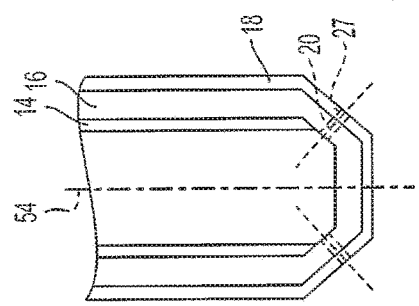
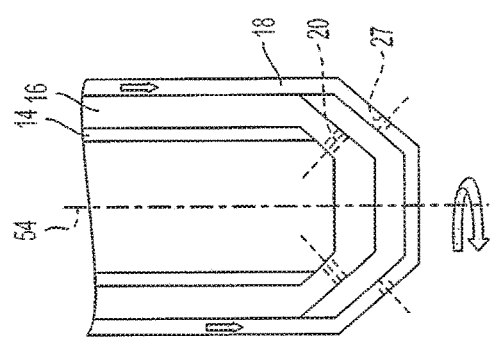
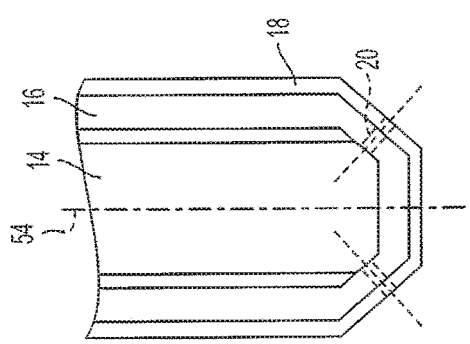

ROTATING FUEL INJECTOR ASSEMBLY

TECHNICAL FIELD

The present disclosure relates to a fuel injector arrangement for supplying fuel into a combustion chamber of an internal combustion engine.

BACKGROUND

The fuel injector arrangement is configured to be inserted into an opening in a housing part to form a part of a fuel injection system. Said fuel injector arrangement or said fuel injection system may be used in an internal combustion engine, such as a diesel or gasoline engine, where said engine can be used in any vehicle or machinery; such as a car, motorcycle, truck, bus, construction equipment or stationary power units.

Fuel injectors are used to supply fuel into the cylinders of an internal combustion engine. According to one engine concept example, a fuel distribution channel (a fuel gallery or rail) is arranged crosswise through a housing for feeding fuel to a plurality of fuel injectors. Each fuel injector comprises an internal fuel channel arrangement extending between an opening into the fuel gallery and an opening in an injector tip forming a spray tip. In the fuel injector, the injection timing may be controlled mechanically and/or electrically/electronically: for example via a plunger by solenoid or piezoelectric actuator.

When fuel is injected into a combustion chamber of a cylinder, the combustion of said fuel results in a high gas pressure, which pressure exerts a force on the injector tip and all the way up to a contact area between the fuel injector and an injector sleeve and/or a housing part receiving the fuel injector. The contact area between the fuel injector and the injector sleeve/housing part is established and maintained by the clamping force of an injector yoke which counteracts the force caused by the gas pressure.

In the fields of diesel engines and direct injection type gasoline engines, a common rail fuel injection apparatus is known to be advantageous to pulverization of fuel spray and high pressure injection. In general, the common rail fuel injection apparatus has a common rail (accumulation chamber) for temporarily storing a fuel which has been pressurized by a high pressure pump. The fuel is injected into cylinders of an engine (or combustion chambers) in a predetermined amount at a time from an injector at a predetermined timing.

The injector generally has a plurality of injection openings (fuel spray outlets) at a lower end thereof which are opened and closed by a needle valve moving up and down inside an injectors body (nozzle body). A spring is also received in the injector body to bias the needle valve in a closing direction (downward direction). The needle valve is immersed in the high pressure fuel (i.e., the needle valve would float in a fuel pool if no downward force acts), and a downward spring force is applied to the needle valve so that a lower end of the needle valve is forced to contact a valve seat so as to close the injection openings of the injector. A downward fuel pressure applied on an upper end of the needle valve is controlled by a pressure control chamber (balance chamber). By appropriately leaking a high pressure fuel from the pressure control chamber, the pressure balance relative to the needle valve is lost so that the needle valve is caused to ascend and therefore the injection openings open.

The needle valve is received in a hole or bore formed in a nozzle body of the injector such that it can move up and down. The high pressure fuel fed from the common rail flows through a cylindrical clearance between the nozzle body hole and the needle valve and reaches the injection openings of the injector.

Accordingly, there is a need to better distribute fuel emitted from the fuel injector in order to obtain better efficiency.

SUMMARY

Accordingly, the present disclosure provides a rotating fuel injector, which better distributes the fuel into the combustion chamber so that the resulting flame develops and propagates to optimize the fuel mass flow rate, the direction and shape of combustion flame, to control and optimize fuel consumption for an internal combustion engine. Moreover, the NOx, CO2, Oxidation and Soot emissions are also optimized during specific engine working periods or for each working key point (Rounds Per Minutes RPM and Break Mean Effective Pressure BMEP) for an internal combustion engine ICE.

In one embodiment of the present disclosure, a rotating fuel injector assembly for a vehicle engine may include a base, an internal tip, an intermediate coaxial tip, and an external coaxial tip. The internal tip may be configured to move between an extended closed position and a retracted open position relative to the base. The intermediate coaxial tip may include an opening defined in a lower region of the intermediate coaxial tip or in another region of the intermediate coaxial tip. The opening abuts the internal tip when the internal tip is in the extended closed position. The external coaxial tip may move between an extended position and a retracted position relative to the base. The external coaxial tip also includes a plurality of apertures wherein each aperture in the plurality of apertures may align with an opening in the intermediate coaxial tip to provide a fluid pathway to the combustion chamber. It is understood that the internal tip may be at least partially disposed within the intermediate coaxial tip, and the intermediate coaxial tip may also be at least partially disposed within the external coaxial tip.

In yet another aspect of the present disclosure, a rotating fuel injector assembly of the present disclosure may include a base, an internal tip, an intermediate coaxial tip and an external coaxial tip. The base is fixed and includes a fuel inlet and a fuel outlet affixed to the base. The internal tip may be operatively configured to move between an extended closed position relative the base and a retracted open position relative to the base. The intermediate coaxial tip further defines an opening in a lower region of the intermediate coaxial tip. The opening abuts the internal tip when the internal tip is in the extended closed position such that fuel does not exit the fuel injector when the internal tip is in the extended closed position. It is further understood that the intermediate coaxial tip is affixed to the base, yet rotates relative to the base. The external coaxial tip may be operatively configured to rotate relative to the base and configured to move between an extended position and a retracted position relative to the base. The external coaxial tip further defines a plurality of apertures wherein each aperture in the plurality of apertures may be operatively configured to align with the opening of the intermediate coaxial tip. It is also understood that the internal tip may be at least partially disposed within the intermediate coaxial tip, and the intermediate coaxial tip may be at least partially disposed within the external coaxial tip.

The rotating fuel injector assembly as described above may further include first, second, third and fourth actuators wherein the fourth actuator may triggers the internal tip to move between the extended closed position and the retracted open position. It should also be noted that the external coaxial tip is configured to move between the retracted position to the extended position via an internal fluid pressure where the internal fluid pressure may be applied by a third actuator and incoming fuel flow from the base fuel inlet while the base fuel by pass outlet can be partially/fully closed. It is understood that the extension and retraction of the external coaxial tip is performed to align the selected aperture of the external coaxial tip with the opening of the intermediate coaxial tip. The pressure of the fluid that causes the extension, the rotation, and the retraction of the external coaxial tip is generated by the base fuel inlet.

Prior to ejecting fuel from the rotating fuel injector assembly, the external coaxial tip may be rotated about a vertical axis to align with the intermediate coaxial tip. As such, the opening in the intermediate coaxial tip may be aligned with a selected aperture in the plurality of apertures while the internal tip is in the extended closed position. The plurality of apertures of external tips have axes which are oriented to let several different curvilinear stream directions of fuel spray from the injector, so the injection of the present disclosure is therefore, not limited only to radial direction spray.

Once the opening and aperture are aligned, the rotating fuel injector assembly may distribute fuel in one of two modes: (1) fixed linear injection with selected stream/spray angle respect to radial direction (or "fixed injection mode"), or (2) rotating curvilinear injection (or "rotating injection mode"). When the fixed curvilinear injection mode is implemented, the protrusion, rotation and retraction movement of the external coaxial tip selects the aperture (with a precise fuel stream angle with respect to the radial direction) of external coaxial tip wherein the aperture will be aligned to the opening in the intermediate coaxial tip. The rotation possible is equivalent to one or a multiple of apertures axis angle present; is possible also to select partial alignment, in order to change the aperture section. The external coaxial tip is operatively configured to be rotationally fixed via a first actuator and a second actuator (basically Clock Wise CW rotation or Anti Clock Wise CCW rotation), and the protrusion and retraction movements are controlled by third actuator. The actuators pressures of the fluid that can cause the extended movement (protrusion), the rotation and the retracted movement of the external coaxial tip can be part of the fuel fluid pressure that is moving fuel from base fuel inlet to bypass fuel outlet. During the selection and alignment of apertures, the internal tip is not retracted. It is understood that when the internal tip is not retracted, the fuel stream cannot pass from the fuel inlet through the apertures and cannot enter into the combustion chamber. After the selection of alignment of apertures, the fourth actuator is retracting the internal tip in open position and curvilinear fuel stream exits the aperture by the external coaxial tip with fuel stream angle respect radial direction. It is also understood that when the internal tip is in the retracted open position a fuel stream may pass from the fuel inlet through the aperture and opening and out to the combustion chamber. When the rotating injection mode is implemented, the intermediate and the external coaxial tips (with the alignment of the opening and aperture which generate a fuel stream angle—as previously described) rotate in unison via a first actuator and a second actuator (clockwise or counter-clockwise) while the internal tip is in the retracted open position. So, in the rotating injection mode, a curvilinear fuel stream exits the aperture of the external coaxial tip when the intermediate and external coaxial tips are rotating in unison. The curvilinear fuel stream may be disposed at a fuel stream rotation angle, angular velocity/acceleration controlled by first and second actuators.

It is understood that in rotating the external coaxial tip and/or the intermediate coaxial tip, internal fluid pressure urges the rotation of each component. This internal fluid pressure is generated by an incoming fuel flow from the fuel inlet with a closed fuel outlet. The first and second actuators applies (and adjusts) the internal fluid pressure to the intermediate and external coaxial tips. When the rotating fuel injector assembly is in a fixed injection mode, a linear fuel stream exits the aperture of the external coaxial tip at a fuel stream angle determined by aligning an aperture axis and an opening axis. However, when the rotating fuel injector assembly is in a rotating injection mode, a curvilinear fuel stream exits the aperture of the external coaxial tip at a fuel stream rotation angle. Therefore, while the external and intermediate coaxial tip are rotating, the rotating tips will produce a curvilinear fuel stream.

It is understood that the first actuator, the second and the third actuator are controlled by (in communication with) an engine control module configured to adjust the internal fluid pressure to let the movements of intermediate and external coaxial tips: the first and second actuators in order to rotate the external coaxial tip so as to align the selected aperture with the opening in the intermediate coaxial tip; the third actuator to extend and/or the retract the external coaxial tip. Thus, the first and second actuators may be configured to rotate only the external or external and internal coaxial tips by adjusting the internal fluid pressure applied. The third actuator may be configured to extend and/or retract the external coaxial tip by adjusting the internal fluid pressure applied.

The intermediate and/or internal coaxial tips rotate relative to the base via the internal fluid pressure exerted on an interior surface on at least one of internal pressure channels defined by the intermediate and/or external coaxial tips. The fluid exert the internal fluid pressure in the rotational pressure channel thereby expanding the rotational channel causing rotation. To enable the CW (clockwise) and CCW (counter-clockwise) rotations, varying internal fluid pressures may be applied to at least two rotational pressure channels defined by the intermediate and/or external coaxial tip. The rotation stops when internal fluid pressure in each pressure channel reaches the new equilibrium.

The fuel inlet and the fuel outlet are in communication with the engine control module in order to generate the internal fluid pressure or the negative internal fluid pressure. The external coaxial tip also is configured to move from extended position to the retracted position when the negative fluid pressure is generated in a zone inside of the external coaxial tip. As the internal fluid pressure or the negative internal fluid pressure is generated, the fuel inlet and the fuel outlet are in communication with the engine control module.

In yet another embodiment of the present disclosure, a rotating fuel injector assembly includes a base, first/second/third/fourth actuators, an internal tip, an intermediate coaxial tip, and an external coaxial tip. The base defines a plurality of fuel passageways and having a fuel inlet in addition to a fuel outlet.

The first, second, third, and fourth actuators may be affixed to the base and may be in communication with an engine control module together with the fuel inlet and outlet. The internal tip may be operatively configured to move between an extended closed position and a retracted open position relative to the base along a vertical axis. The internal tip may be triggered by the fourth actuator which is in communication with an engine control module. When the internal tip moves to a retracted open position, an incoming fuel flow from the fuel inlet is provided to aligned apertures of the intermediate and external coaxial tips for injection into the combustion chamber. The intermediate coaxial tip may be affixed to the base, and may be rotate relative to the base around the injector vertical axis and may define an opening in a lower region of the intermediate coaxial tip. The opening may abut, covered and closed by the internal tip when the internal tip is in the extended closed position thereby closing off any fuel flow to the combustion chamber.

The external coaxial tip may be operatively configured to move between an extended position and a retracted position relative to the base, and to rotate around the vertical injector axis. The external coaxial tip may include a plurality of apertures. Each aperture in the plurality of apertures being configured to align with the opening defined in the intermediate coaxial tip. Each aperture in the plurality of apertures having a unique axis angle, and unique angle respect to radial direction. The intermediate coaxial tip and the external coaxial tip may be configured to rotate about the vertical axis via the first and second actuators. The fuel inlet may be configured to provide an incoming fuel flow while the fuel inlet is open and the fuel by pass outlet is closed in order to generate an internal fluid pressure. The intermediate coaxial tip may rotate about the vertical axis when the internal fluid pressure is applied to an inner pressure channel defined by the intermediate coaxial tip. The fluid exert the pressure in the channel between intermediate coaxial tip and base, opening the channel, pushing the interior surface of intermediate coaxial tip to rotate it.

Similarly, the external coaxial tip rotates about the vertical axis when the internal fluid pressure is applied to a rotational pressure channel defined by the external coaxial tip. At least one of the first and second actuators may apply the internal fluid pressure to the rotational pressure channel. The first, second, third and fourth actuators, the fuel outlet and the fuel inlet cooperate via the engine control module to adjust the internal fluid pressures applied to the external coaxial tip and the intermediate coaxial tip The rotation and extended/retracted movement of external tip relative to base is necessary to select the aligned aperture to be aligned with intermediate tip hole, and is done not during internal combustion phase, so "syncopated" to the combustion event in combustion chamber. The rotation of intermediate and external tip is done during combustion phase (rotating curvilinear injection or "rotating injection mode") so "downbeat" with the combustion event in combustion chamber.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

FIG. 5A illustrates a cross-sectional view of a second embodiment of the present disclosure when the twisting fuel injector is closed and not twisting.

FIG. 5B illustrates a cross section of the twisting fuel injector in FIG. 5A along line B-B.

FIG. 7A is a cross-sectional view of a rotating fuel injector assembly in a fixed injection mode wherein the assembly is in a closed position where the opening is not aligned with an aperture or is aligned with previous injector working settled aperture.

FIG. 7B is a cross-sectional view of a rotating fuel injector assembly in a fixed injection mode where the external coaxial tip is extended and rotating in order to align a selected aperture (stream/spray direction) with an opening in the intermediate coaxial tip during antagonist syncopated twisted rotation.

FIG. 7C is a cross-sectional view of a rotating fuel injector assembly in a fixed injection mode where the selected aperture (stream/spray direction) is aligned with the opening in the intermediate coaxial tip but the internal tip is in the extended closed position and the injector ends antagonist syncopated twisted rotation.

FIG. 7D is a cross-sectional view of a rotating fuel injector assembly in a fixed injection mode wherein fuel being injected out of the assembly while rotation is fixed with stream/spray direction chosen in FIG. 7B.

FIG. 7E is a partial perspective view of a rotating fuel injector assembly in a fixed injection mode wherein the fuel is injected out of the assembly in a linear stream (fuel injection after antagonist syncopated twisted tip rotation).

FIG. 8A is a cross-sectional view of a rotating fuel injector assembly in a rotating injection mode wherein the assembly in a closed position and the opening is not aligned with an aperture or is aligned with previous injector working settled aperture.

FIG. 8B is a cross-sectional view of a rotating fuel injector assembly in a rotating injection mode where the external coaxial tip is extended and rotating in order to align a selected aperture with an opening in the intermediate coaxial tip.

FIG. 8C is a cross-sectional view of a rotating fuel injector assembly in a rotating injection mode where the selected aperture is aligned with the opening in the intermediate coaxial tip but the internal tip is in the extended closed position.

FIG. 8D is a cross-sectional view of a rotating fuel injector assembly in a rotating injection mode wherein fuel being injected out of the assembly while the external and intermediate coaxial tips are rotating in unison.

Like reference numerals refer to like parts throughout the description of several views of the drawings.

DETAILED DESCRIPTION

Figure 1:
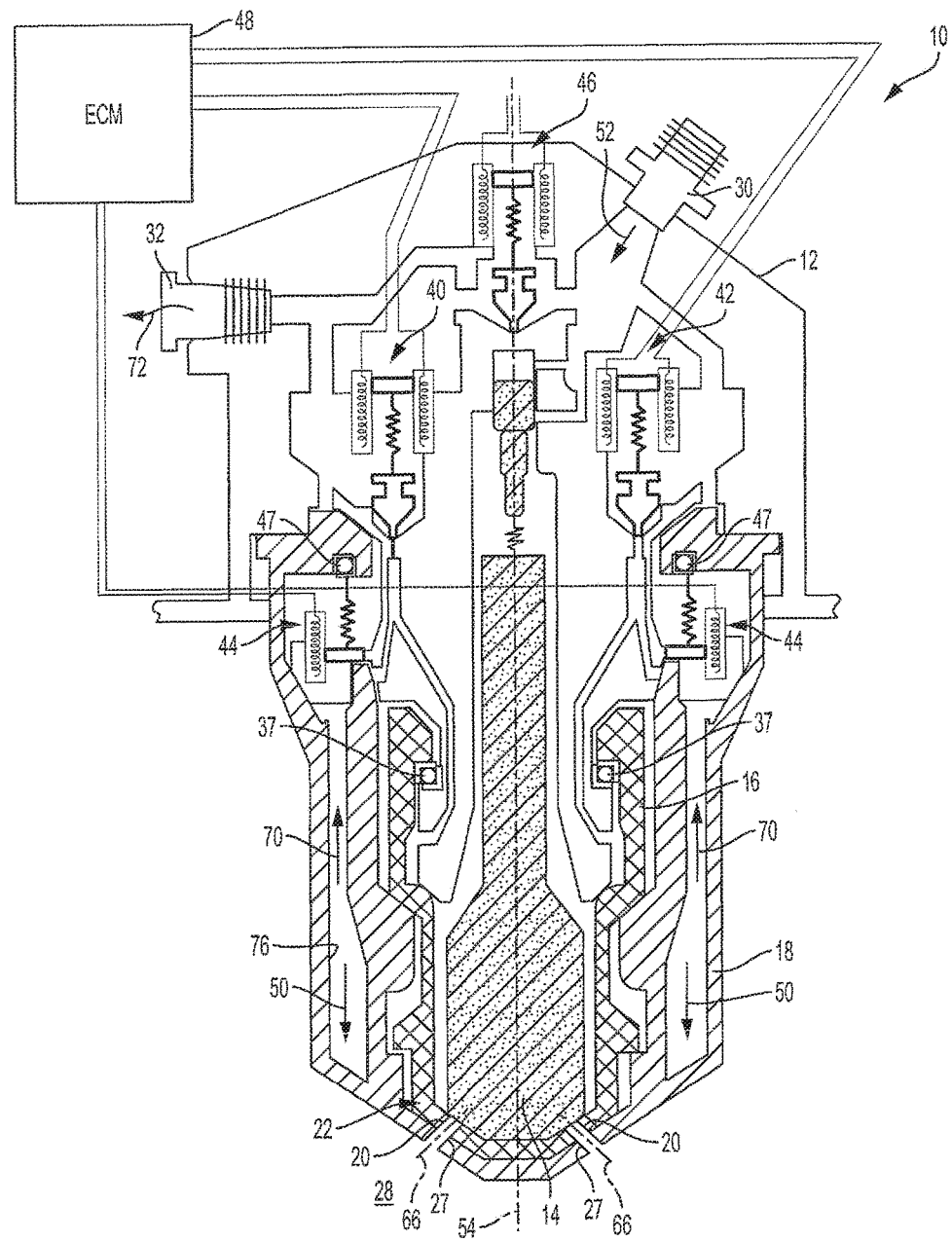
FIG. 1 illustrates a cross-sectional view of an embodiment of the twisting fuel injector of the present disclosure when the twisting fuel injector is closed.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

With reference to FIG. 1, a cross-sectional view of an embodiment of the present disclosure is provided. As shown, a rotating fuel injector assembly 10 of the present disclosure may include a base 12, an internal tip 14, an intermediate coaxial tip 16 and an external coaxial tip 18. The base 12 includes a fuel inlet 30 and a fuel outlet 32 (to fuel bypass circuit—not shown). The fuel inlet 30 and fuel outlet 32 are affixed to the base 12. The internal tip 14 may be operatively configured to move between an extended closed position (shown in FIG. 1) relative to the base 12 and a retracted open position (shown in FIG. 3) relative to the base 12. The intermediate coaxial tip 16 further defines an opening 20 in a lower region 22 of the intermediate coaxial tip 16. The opening 20 abuts (is blocked by) the internal tip 14 when the internal tip 14 is in the extended closed position (shown in FIG. 1) such that fuel cannot exit the fuel injector assembly into the combustion chamber 28 via opening 20 and aligned/selected aperture 27 when the internal tip 14 is in the extended closed position.

It is further understood that the intermediate coaxial tip 16 is affixed to the base 12, yet rotates relative to the base 12 by one or more bearings 37 and/or hertzian contact surface. The external coaxial tip 18 may be operatively configured to rotate relative to the base 12 and relative to the intermediate coaxial tip 16 by one or more bearings 47 and/or hertzian contact surface. The external coaxial tip 18 is also configured to move between an extended position (shown in FIG. 2) and a retracted position (shown in FIG. 1) relative to the intermediate coaxial tip 16 and the base 12. The external coaxial tip 18 further defines a plurality of apertures 24 (shown in FIG. 6) wherein any one aperture 26 shown in FIG. 6) in the plurality of apertures 24 may be operatively configured to align with the opening 20 of the intermediate coaxial tip 16. It is also understood that the internal tip 14 may be at least partially disposed within the intermediate coaxial tip 16, and the intermediate coaxial tip 16 may be at least partially disposed within the external coaxial tip 18 as shown in FIG. 1.

Figure 2:
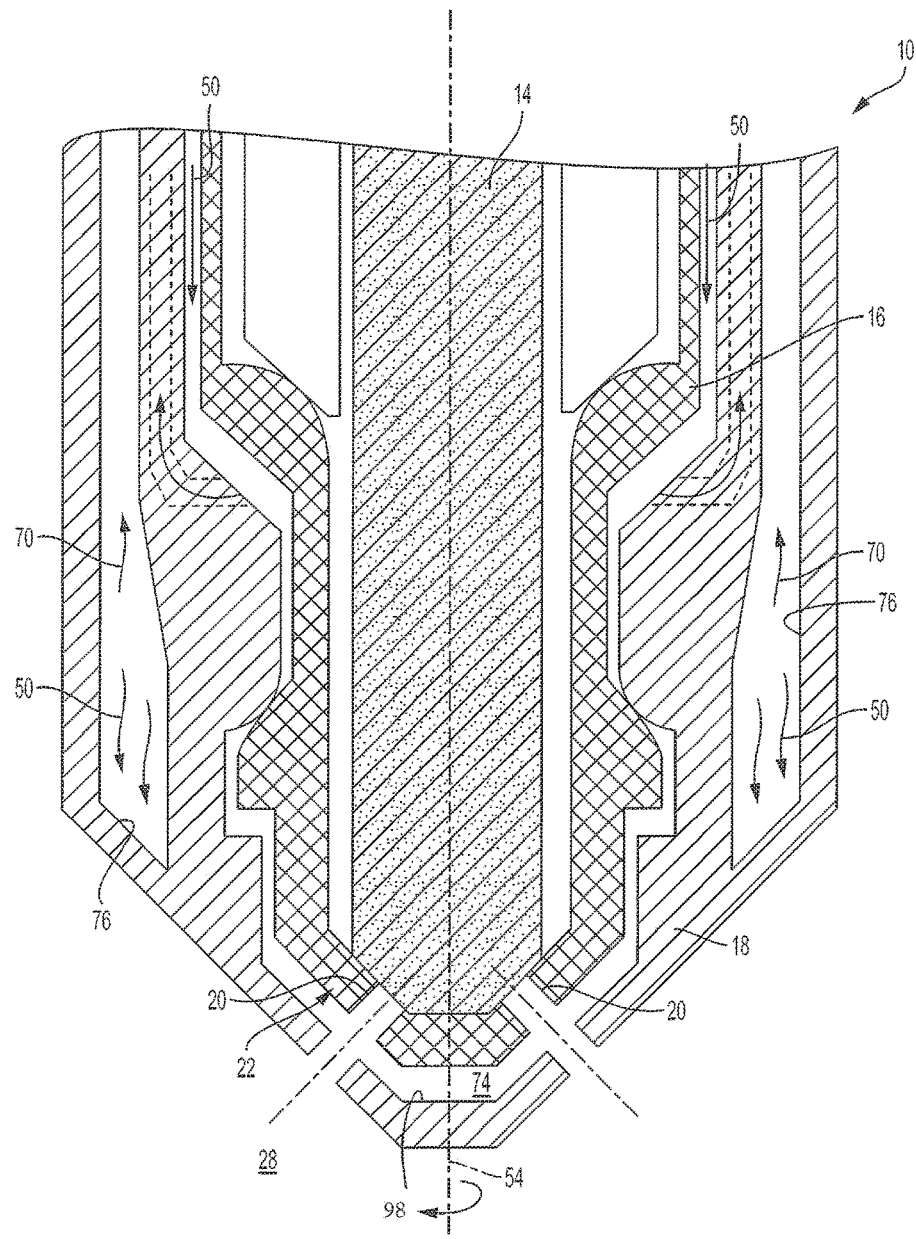
FIG. 2 illustrates a cross-sectional view of an embodiment of the twisting fuel injector of the present disclosure when the twisting fuel injector external tip is in extended position and rotate to select the aperture, while the twisting fuel injector is not injecting any fuel.
Figure 3:
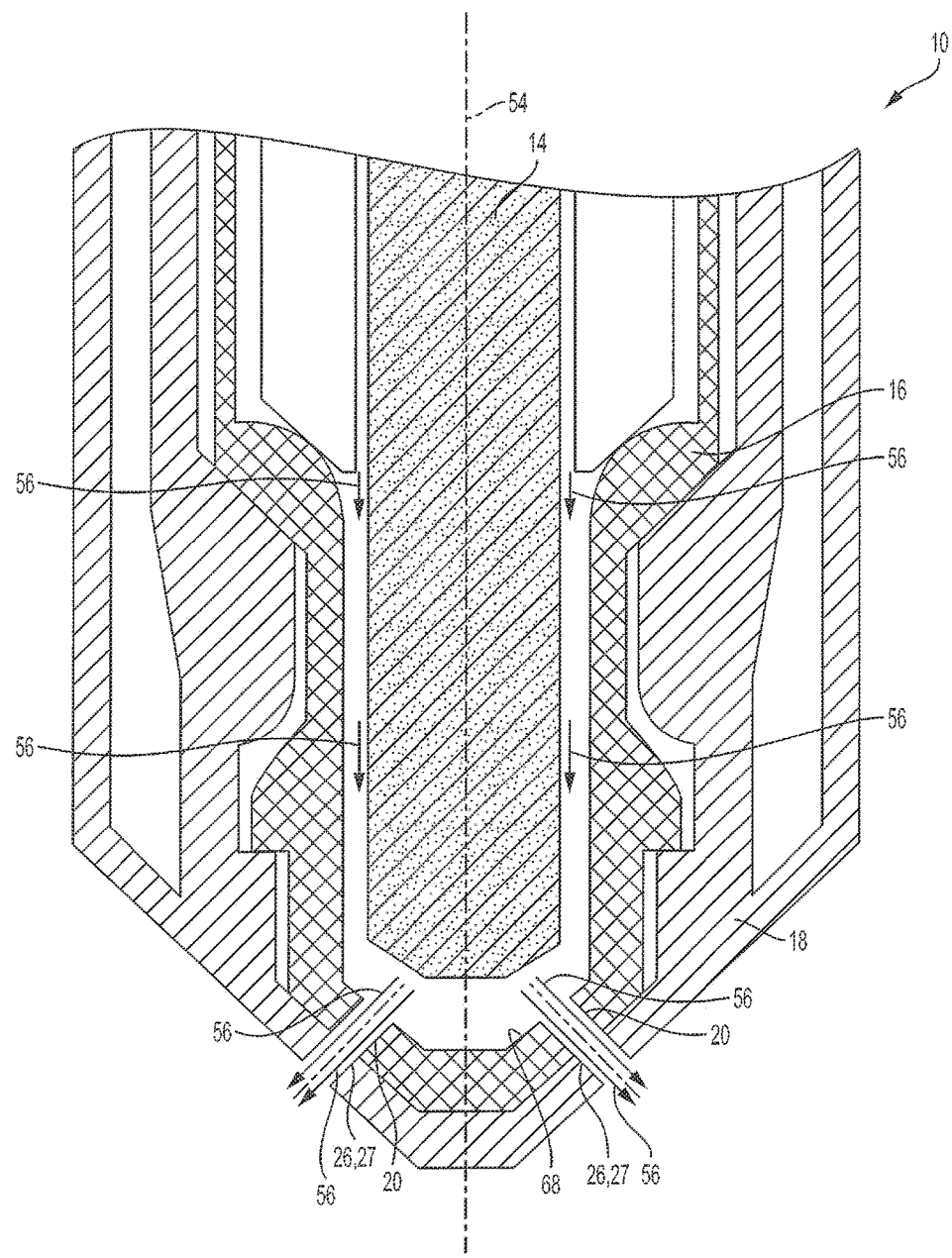
FIG. 3 illustrates a cross-sectional view of an embodiment of the twisting fuel injector of the present disclosure when the twisting fuel injector is injecting fuel into the combustion chamber after the antagonist syncopated twisted rotation—syncopated relative to the combustion event in combustion chamber.
Figure 4:
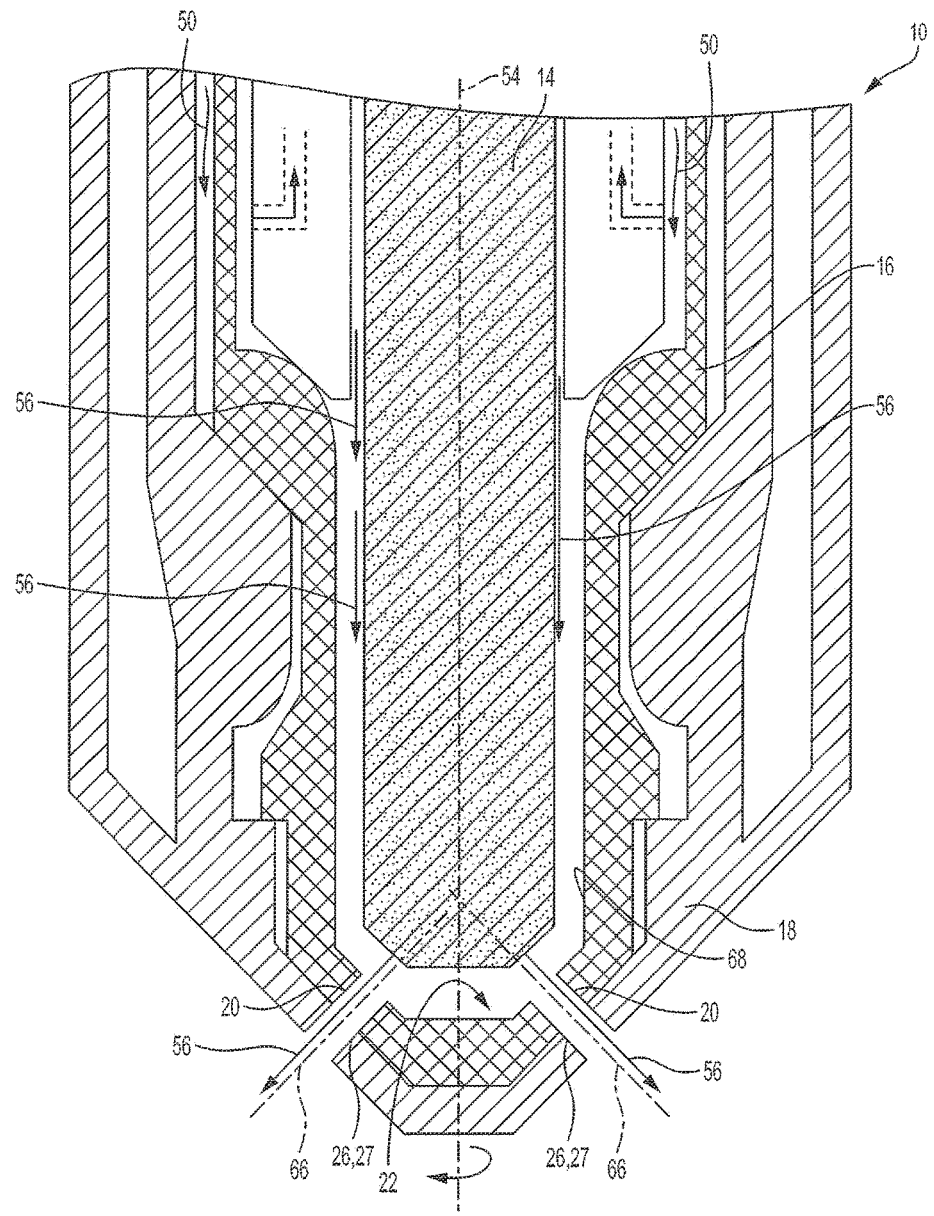
FIG. 4 illustrates a cross-sectional view of an embodiment the twisting fuel injector of the present disclosure when the twisting fuel injector is both rotating and injecting fuel into the combustion chamber in a downbeat twisting rotation (downbeat with the combustion event in combustion chamber).

Referring again to FIG. 1, the rotating fuel injector assembly 10 as described above may further include first, second, third and fourth actuators 40, 42, 44, 46 wherein the fourth actuator 46 may triggers the internal tip 14 to move between the extended closed position (shown in FIG. 1) and the retracted open position (shown in FIGS. 3 and 4). It is understood that the first, second, third and fourth actuators 40, 42, 44, 46 are in communication with the engine control module 48. With reference to FIG. 2 and as previously noted, the external coaxial tip 18 is configured to move between the retracted position (shown in FIG. 1) to the extended position (shown in FIG. 2) via an internal fluid pressure 50 where the internal fluid pressure 50 may be applied by a third actuator 44 (shown in FIG. 1) and an incoming fuel flow 52 (shown in FIG. 1) from the fuel inlet 30 while the fuel outlet 32 is partially or totally closed.

As shown in FIGS. 2, 7B, and 8B, prior to ejecting fuel from the rotating fuel injector assembly 10, the external coaxial tip 18 may be rotated by an angle 65 (shown in FIG. 8F) about a longitudinal axis 54 to align with the selected aperture 27 of to the opening 20. As such, the opening 20 in the intermediate coaxial tip 16 may be aligned with a selected aperture 27 in the plurality of apertures 24 while the internal tip 14 is in the extended closed position as further shown in FIGS. 3, 7C, and 8C. The fuel stream rotating angle 65 can be defined as the angle of rotation of the external coaxial tip to align the selected aperture 27 to opening 20 of intermediate coaxial tip 16, positive if rotated anticlockwise +CCW, negative if rotate clockwise –CW, considering to observe the injector by the longitudinal axis 54 injector in the direction from combustion chamber 28 (bottom) towards base 14 (top).

Figure 8E:
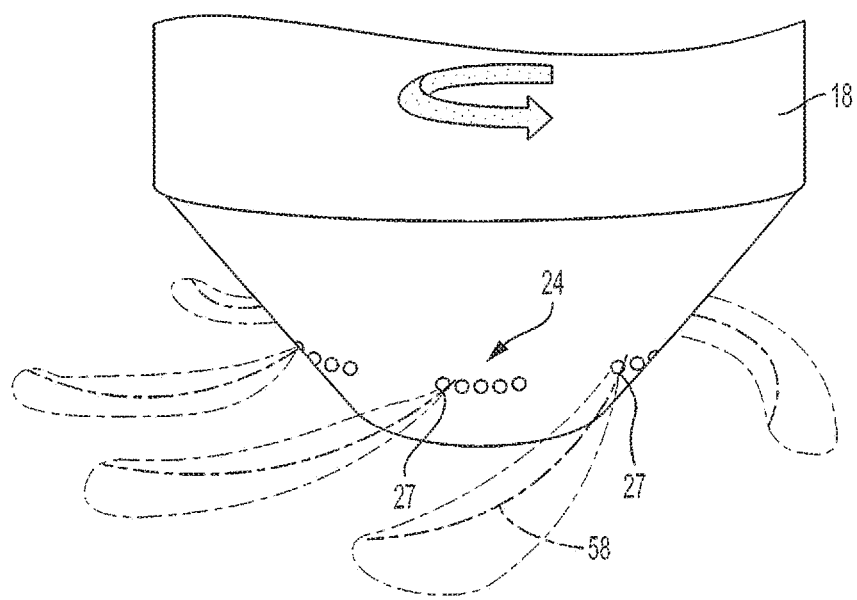
FIG. 8E is a partial perspective view of a rotating fuel injector assembly in a rotating injection mode wherein the fuel is injected out of the assembly with a curvilinear stream trajectory.
Figure 8F:
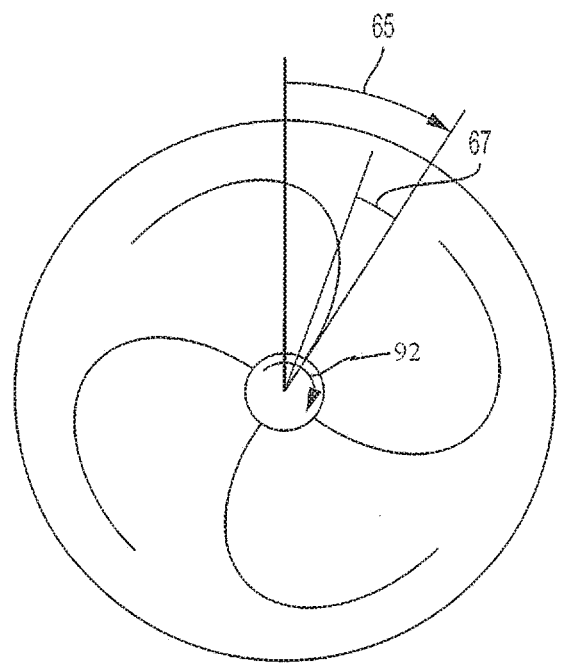
FIG. 8F is a top view of the rotating fuel stream at a fuel stream rotation angle at a predetermined angular velocity—downbeat twisting injection.

As shown in FIGS. 1, 7C, and 8C, once the opening 20 and selected aperture 27 are aligned, the rotating fuel injector assembly 10 may distribute fuel in one of two modes: (1) rotating injection mode (shown in FIGS. 4, 8A-8E); or (2) fixed injection mode (shown in FIGS. 3, 7A-7E). When the rotating injection mode is implemented, the intermediate and the external coaxial tips 16, 18 rotate in unison (shown in FIGS. 8D-8E) via a first actuator 40 and a second actuator 42 (both actuators shown in FIG. 1) when the internal tip 14 is in the retracted open position as shown in FIG. 8D. It is understood that when the internal tip 14 is in the retracted open position a fuel stream 56 may pass from the fuel inlet 30 through the aperture 27 and opening 20 and out to the combustion chamber 28 as shown in FIGS. 8D-8E.

Referring again to FIGS. 8D and 8E, in the rotating injection mode, a curvilinear fuel stream 58 exits the aperture 27 of the external coaxial tip 18 when the intermediate and external coaxial tips 16, 18 are rotating in unison. The curvilinear fuel stream 58 is disposed or oriented at a fuel stream angle 90 (shown in FIG. 8E) along the aperture axis 66, and with angular velocity 92 (shown in FIG. 8F) (positive) if rotated anticlockwise +CCW, negative if rotate clockwise –CW, considering to observe the injector by the longitudinal axis 54 injector in the direction from combustion chamber 28 (bottom) towards base 12 (top)). Therefore, when the rotating fuel injector assembly 10 is in a rotating injection mode, a curvilinear fuel stream 58 exits the selected aperture 27 of the external coaxial tip 18 (as shown in FIGS. 8D and 8E).

Referring now to FIGS. 7A-7E, the fixed injection mode is shown. As shown in FIGS. 7A-7C together with FIGS. 8A-8C, the steps for aligning the opening and the selected aperture prior to the fuel injection (shown in FIGS. 7D and 8D) are the same for fixed injection mode (FIGS. 7A-7E) as they are for rotating injection mode (FIGS. 8D-8E). Both modes may, but not necessarily, start with the internal tip 14 in the extended closed position where no fuel is injected and the selected aperture 27 is not aligned with the opening as shown in FIGS. 7A and 8A. Both modes also contemplate that the external coaxial tip 18 may then extend and rotate relative to the intermediate coaxial tip 16 in order to align the opening 20 and the selected aperture 27 as shown in FIGS. 7B and 8B. Moreover, both modes may also contemplate that the external coaxial tip 18 may retract towards the intermediate coaxial tip 16 once the opening 20 and the selected aperture 27 are aligned as shown in FIGS. 7C and 8C.

However, in contrast to the rotating injection mode as previously described, the fixed injection mode shown in FIGS. 7A-7E contemplates that the intermediate and the external coaxial tips 16, 18 may be operatively configured to be rotationally fixed via the first actuator 40 and the second actuator 42 (shown in FIG. 1) while the internal tip 14 is in the extended closed position (shown in FIG. 7D). The linear fuel stream 64 may then be injected into the combustion chamber 28 while the intermediate and external coaxial tips 16, 18 are rotationally fixed and when the internal tip 14 is moved to the retracted open position (shown in FIGS. 7D, 7E). When the rotating fuel injector assembly 10 is in a fixed injection mode (shown in FIG. 7D), a linear fuel stream 64 exits the opening 20 and the aperture 27 of the external coaxial tip 18 along the aperture axis 66 at a fuel stream angle 60 (FIGS. 6 and 7E) relative to radial direction 69. The fuel stream angle 60, 67 is the angle determined by the aperture axis 66 relative to the radial direction (positive if CCW, negative if CW)

Figure 9:
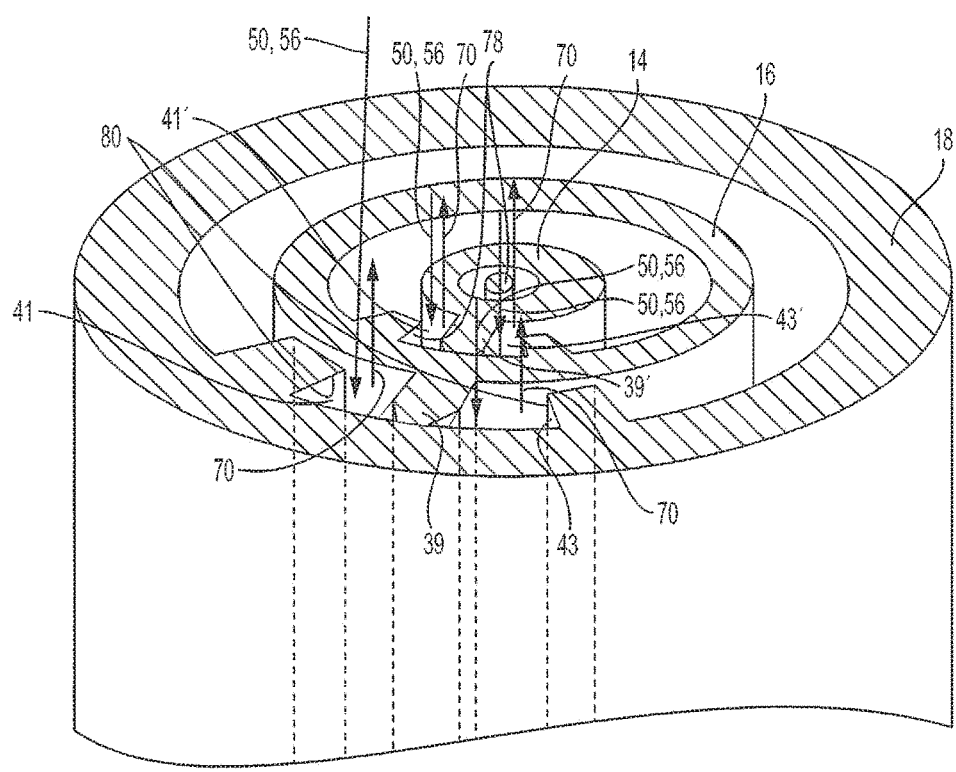
FIG. 9 is a partial, expanded, schematic perspective view of the rotating fuel injector assembly along line 5A-5A in FIG. 1 showing pressure channels defined in both the external and intermediate coaxial tips.

As shown in FIG. 1 and in FIG. 9, it is understood that the rotation of the external coaxial tip 18 and of intermediate coaxial tip 16, the extended and retracted internal tip 14 movement, and the extended and retracted external coaxial tip 18 movement, are operational movements triggered by internal fluid pressures 50 generated by the first, second, third and fourth actuators 40, 42, 44, 46. Each actuator can be in the form of a solenoid (or piezoelectric) part connected to Engine Control Module 48, that allows to transform the electric impulse received from Engine Control Module 48 in a movement of a plunger, opening opportunely an orifice in a channel to let control flow/pressure thru the channel opened. When the (solenoid or piezoelectric parts) actuators 40, 42, 44, 46 are not active, and the plunger for each associated actuator may be biased back to the closed position via biasing means 49 or spring. A biasing means 49 (in the form of a spring) may also be implemented ensure the internal tip 14 movement.

Referring to FIG. 9, a partial isometric view of the rotating fuel injector assembly is shown along line 5A-5A in FIG. It is understood that in order to rotate the external coaxial tip 18 and/or the intermediate coaxial tip 16, different internal fluid pressures 50 may be applied to each component to urge the rotation. The internal fluid pressure 50 are shown in FIG. 9. The internal fluid pressure is generated by first actuator 40 and second actuator 42 by adjusting an incoming fuel flow 52 from the fuel inlet 30 with a fully/partially closed fuel outlet 32 (shown in FIG. 1). The first and second actuators 40, 42 starting from incoming fuel flow 52 may apply (and adjust) the internal fluid pressure 50 to the sub-channels 41 and 43 between intermediate and external coaxial tips 16, 18, and/or to the sub-channels surfaces 41' and 43' between base and intermediate coaxial tip 14, 16.

The fuel flow 50 may enter in sub-channels divided by protrusions/middle shoes/skates 39, 39'. The fuel flows 50 triggered by first and second actuators 40, 42 can expand a first sub-channel loading surface 41, 41' while restricting a second sub-channel not loading/loading less surface 43, 43', when the external coaxial tip 18 is moving between extended and retracted positions. The external tip rotation is allowed or when there is the extended movement of external tip or in unison with intermediate coaxial tip rotation, only when the internal tip 10 is moving upwards (and/or in the retracted open position-shown in FIG. 3).

As shown in FIG. 9, the intermediate coaxial tip 16 can rotate relative to the base 12 via the internal fluid pressure 50 exerted on inner pressure channel 78 of the intermediate coaxial tip 16. The internal fluid pressure 50 may expand the inner pressure channel 78, thereby pushing against the interior surface of intermediate coaxial tip and causing rotation.

Similarly, it is generally understood that the external coaxial tip 18 can rotate relative to the intermediate coaxial tip 16 via the internal fluid pressure 50 exerted on the rotational pressure channel 80 defined by the external coaxial tip 18. The internal fluid pressure 50 may expand the rotational pressure channel 78 thereby pushing against the interior surface of external coaxial tip and causing rotation.

To enable the CCW and CW rotations, different internal fluid pressures 50 are applied to the inner pressure channel 78 and the rotational pressure channel 80. The rotation stops until the internal fluid pressure in each channels are generally equal providing equilibrium. The engine control module 48 and the first and second actuators 40, 42 are operatively configured to generate the varying internal fluid pressures 50 in the inner pressure channel 78 and the rotational pressure channel 80 so as to achieve the desired movement as described. It is generally understood that the first actuator 40 and the second actuator 42 may be in communication with an engine control module 48.

Therefore, the engine control module 48 and the first and second actuators 40, 42 are operatively configured to rotate the external coaxial tip 18 relative to intermediate coaxial tip to determine the selected aperture 27 to be aligned with the opening 20 in the intermediate coaxial tip 16. The engine control module 48 and the first and second actuators 40, 42 are operatively configured also to rotate intermediate coaxial tip relative to base 12. Thus, the first and second actuators 40, 42 may be configured to rotate at least one of the external and intermediate coaxial tips 16, 18, by adjusting the internal fluid pressure applied to the external coaxial tip.

As shown in FIG. 1, it is further understood that the fuel outlet 32 and the fuel inlet 30 are configured to generate a negative fluid pressure 70 via an exiting fuel flow 76 into the fuel outlet 32 while the fuel outlet 32 is open and the fuel inlet 30 is partially/fully closed. Also it is further understood that the fuel outlet 32 and the fuel inlet 30 are configured to generate an exiting fuel flow 76 toward and through the fuel outlet 32, when the injectors actuators 40, 42, 44, 46 are all fully closed. The external coaxial tip 18 is configured to move from the extended position (shown in FIGS. 2, 7B, 8B) to the retracted position (shown in FIGS. 1, 7A, 7C, 8A, 8C) when the negative fluid pressure 70 is generated in a chamber 76 (shown in FIG. 2) in the external coaxial tip 18. As the internal fluid pressure 50 or the negative internal fluid pressure 70 (shown in FIG. 1 and FIG. 2) is generated, the fuel inlet 30 and the fuel outlet 32 are in communication with the engine control module 48.

Zone 74 is another portion of the fuel injector assembly 10 which is expanded when the external tip is in the extended position (shown in FIG. 2). The external tip 18 does not move to the extended position during combustion. However, during the engine phase of intake, the coaxial external tip 18 may be in the extended position given that the pressure in the combustion chamber has to be low. When the coaxial external tip 18 is in the extended position, the zone 74 is filled by the combustion chamber air via the plurality of apertures 24. In contrast, when the external tip moves to the retracted position of FIG. 1, the little part of air present is flows out of zone 74 to the combustion chamber 28 via apertures 24 and thus, the air is not mixing with fuel flow 56.

As shown in FIG. 1, a rotating fuel injector assembly 10 of the present disclosure may include a base 12, first/second/third/fourth actuators 40, 22, 23, 24, an internal tip 14, an intermediate coaxial tip 16, and an external coaxial tip 18. The base 12 includes a fuel inlet 30 in addition to a fuel outlet 32. The first, second, third, and fourth actuators 40, 42, 44, 46 may be affixed to the base 12 and may be in communication with an engine control module 48 together with the fuel inlet 30 and outlet 32. The internal tip 14 may be operatively configured to move between an extended closed position (shown in FIG. 1) and a retracted open position (shown in FIG. 3) relative to the base 12 along a longitudinal axis 54. The internal tip 14 may be triggered by the fourth actuator 46 which is in communication with an engine control module 48. When the internal tip 14 moves to a retracted open position (shown in FIG. 3), an incoming fuel flow 56 shown in FIG. 1 from the fuel inlet 30 is passing by an channel opened by the plunger of actuator 46, and fuel flow 56 is provided between internal 14 and intermediate 16 tips to the aligned aperture 26, 27 for injection into the combustion chamber 28. The intermediate coaxial tip 16 may be affixed to the base 12 and may define an opening 20 in a lower region 22 (shown in FIG. 3 and FIG. 4) of the intermediate coaxial tip 16. The opening 20 may abut the internal tip 14 when the internal tip 14 is in the extended closed position thereby closing off any fuel flow 56 to the combustion chamber 28 as shown in FIG. 1.

Figure 6:
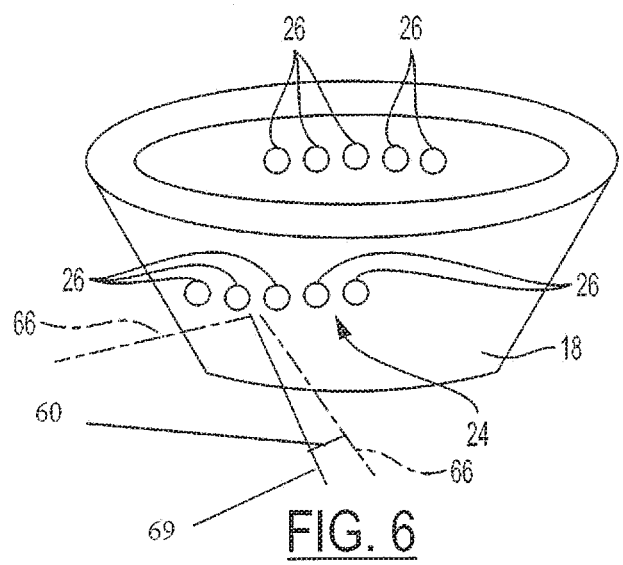
FIG. 6 is a partial isometric schematic view of the external coaxial tip of FIG. 1.

As previously described above, the external coaxial tip 18 may be operatively configured to move between an extended position (shown in FIG. 2) and a retracted position (shown in FIG. 1) relative to the base 12. Referring now to FIG. 6, the external coaxial tip 18 may include a plurality of apertures 24, with inlet/inner holes 66 spacing different to external holes 67 spacing. Each aperture 27 in the plurality of apertures 24 may be configured to align with the opening 20 defined in the intermediate coaxial tip 16.

With reference now to FIGS. 5A and 5B, FIG. 5A illustrates an embodiment of rotating fuel injection assembly 10 where the internal tip 14 is in the closed extended position while FIG. 5B shows the cross section of the internal tip 14 as well as the intermediate and external coaxial tips 16, 18 along line 5B in FIG. 5A. As shown in FIG. 5B, each aperture 27 in the plurality of apertures 24 may also have a unique aperture axis 66 disposed at varying angles 65 (angles relative to radial direction) as shown in FIG. 5B. Moreover, as shown in FIGS. 7B (for fixed injection mode) and 8B (for rotating injection mode), the intermediate coaxial tip 16 and the external coaxial tip 18 may be configured to rotate about the longitudinal axis 54 via the first and second actuators 40, 42 (shown in FIG. 1).

Referring back to FIGS. 1 and 2, the third actuator 44 (shown in FIG. 1) may be configured to apply the internal fluid pressure 50 and to allow the negative internal pressure 70 to an interior surface 98 of the external coaxial tip 18 to allow the external coaxial tip 18 to move between the extended position (shown in FIG. 2) and the retracted position (shown in FIG. 1). The first, second, third and fourth actuators 40, 42, 44, 46 the fuel outlet 32 and the fuel inlet 30 cooperate via the engine control module 48 to adjust the internal fluid pressures 50 applied to the external coaxial tip 18 and/or the intermediate coaxial tip 16.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A rotating fuel injector assembly comprising:
   a base having a fuel inlet and a fuel outlet;
   an internal tip operatively configured to move between an extended closed position relative the base and a retracted open position relative to the base;
   an intermediate coaxial tip having an opening defined in a lower region of the intermediate coaxial tip, and the opening abutting the internal tip when the internal tip is in the extended closed position, the intermediate coaxial tip being affixed to the base; and
   an external coaxial tip operatively configured to rotate relative to the base and configured to move between an extended position and a retracted position relative to the base, the external coaxial tip having a plurality of apertures, each aperture in the plurality of apertures operatively configured to align with the opening of the intermediate coaxial tip;
   wherein the internal tip is partially disposed within the intermediate coaxial tip, and the intermediate coaxial tip is at least partially disposed within the external coaxial tip.

2. The rotating fuel injector assembly as defined in claim 1 further comprising a fourth actuator which triggers the internal tip to move between the extended closed position and the retracted open position.

3. The rotating fuel injector assembly as defined in claim 2 wherein the external coaxial tip is configured to move between the retracted position to the extended position via an internal fluid pressure, the internal fluid pressure being applied by a third actuator and an incoming fuel flow from the fuel inlet while the fuel outlet is closed.

4. The rotating fuel injector assembly as defined in claim 3 wherein the external coaxial tip is operatively configured to rotate relative to the intermediate coaxial tip to align the opening with a selected aperture in the plurality of apertures while the internal tip is in the extended closed position.

5. The rotating fuel injector assembly as defined in claim 4 wherein the intermediate and the external coaxial tips are operatively configured to rotate in unison via a first actuator and a second actuator when the internal tip is in the retracted open position.

6. The rotating fuel injector assembly as defined claim 4 wherein the intermediate and the external coaxial tips are operatively configured to be rotationally fixed via a first actuator and a second actuator when the internal tip is in the retracted open position.

7. The rotating fuel injector assembly as defined in claim 4 wherein the internal fluid pressure is configured to urge the rotation of the external coaxial tip.

8. The rotating fuel injector assembly as defined in claim 5 wherein a curvilinear fuel stream exits the aperture of the external coaxial tip when the intermediate and external coaxial tips are rotating in unison, the curvilinear fuel stream being disposed at a fuel stream angle equivalent to an aperture axis angle.

9. The rotating fuel injector assembly as defined in claim 6 wherein a linear fuel stream exits the aperture of the external coaxial tip at a fuel stream angle, determined by aligning an aperture axis and an opening axis.

10. The rotating fuel injector assembly as defined in claim 7 wherein a first actuator and a second actuator are in communication with an engine control module configured to determine the selected aperture to be aligned with the opening in the intermediate coaxial tip, the first and second actuators configured to rotate at least one of the external and internal coaxial tips by adjusting the internal fluid pressure applied to the external and internal coaxial tips.

11. The rotating fuel injector assembly as defined in claim 10 wherein the intermediate coaxial tip rotates relative to the base via an internal fluid pressure exerted on an interior surface of the intermediate coaxial tip.

12. The rotating fuel injector assembly as defined in claim 10 wherein the fuel outlet and the fuel inlet are configured to generate a negative fluid pressure via an exiting fluid flow into the fuel outlet while the fuel outlet is open and the fuel inlet is closed.

13. The rotating fuel injector assembly as defined in claim 12 wherein the external coaxial tip is configured to move from the extended position to the retracted position when the negative fluid pressure is generated in a zone proximate to the external coaxial tip.

14. The rotating fuel injector assembly as defined in claim 13 wherein the fuel inlet and the fuel outlet are in communication with the engine control module.

15. A rotating fuel injector assembly comprising:
   a base defining a plurality of fuel passageways and having a fuel inlet in addition to a fuel outlet;
   a first actuator, a second actuator, a third actuator and a fourth actuator affixed to the base and being in communication with an engine control module;
   an internal tip operatively configured to move between an extended closed position and a retracted open position relative to the base along a vertical axis, the internal tip being triggered by the fourth actuator;
   an intermediate coaxial tip affixed to the base and defining an opening in a lower region of the intermediate coaxial tip, the opening abutting the internal tip when the internal tip is in the extended closed position; and
   an external coaxial tip operatively configured to move between an extended position and a retracted position relative to the base, the external coaxial tip having a plurality of apertures, each aperture in the plurality of apertures being configured to align with the opening defined in the intermediate coaxial tip, and each aperture in the plurality of apertures having a unique axis angle;
   wherein the intermediate coaxial tip and the external coaxial tip being configured to rotate about the vertical axis via the first and second actuators.

16. The rotating fuel injector assembly as defined in claim 15 wherein the fuel inlet is configured to provide an incoming fuel flow while the fuel inlet is open and the fuel outlet is closed in order to generate an internal fluid pressure.

17. The rotating fuel injector assembly as defined in claim 16 wherein the intermediate coaxial tip rotates about the vertical axis when the internal fluid pressure is applied to an inner pressure channel defined by the intermediate coaxial tip, at least one of the first and second actuators applying the internal fluid pressure to the inner pressure channel.

18. The rotating fuel injector assembly as defined in claim 16 wherein the external coaxial tip rotates about the vertical axis when the internal fluid pressure is applied to a rotational pressure channel defined by the external coaxial tip, at least one of the first and second actuators applying the internal fluid pressure to the rotational pressure channel.

19. The rotating fuel injector assembly as defined in claim 12 wherein the third actuator is configured to apply the internal fluid pressure to an interior surface of the external coaxial tip to allow the external coaxial tip to move between the extended position and the retracted position.

20. The rotating fuel injector assembly as defined in claim 19 wherein the first, second, third and fourth actuators, the fuel outlet and the fuel inlet cooperate via the engine control module to adjust the internal fluid pressure applied to the external coaxial tip and the intermediate coaxial tip.

* * * * *